US010481722B2

(12) United States Patent
Mu et al.

(10) Patent No.: US 10,481,722 B2
(45) Date of Patent: Nov. 19, 2019

(54) TOUCH DEVICE DETACHABLY CONNECTED TO DISPLAY DEVICE, DISPLAY DEVICE AND INTELLIGENT DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jingfei Mu, Beijing (CN); Cheng Chang, Beijing (CN); Dawei Wang, Beijing (CN); Rui Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 294 days.

(21) Appl. No.: 15/204,719

(22) Filed: Jul. 7, 2016

(65) Prior Publication Data
US 2017/0228082 A1 Aug. 10, 2017

(30) Foreign Application Priority Data

Feb. 4, 2016 (CN) .......................... 2016 1 0080262

(51) Int. Cl.
G06F 3/045 (2006.01)
G06F 3/041 (2006.01)
(Continued)

(52) U.S. Cl.
CPC .......... *G06F 3/0416* (2013.01); *G06F 3/0412* (2013.01); *G06F 1/1654* (2013.01); *G06F 1/1698* (2013.01); *G06F 2203/04103* (2013.01)

(58) Field of Classification Search
CPC .... G06F 1/1683; G06F 1/1698; G06F 1/1654; G06F 3/0416; G06F 3/0412
(Continued)

(56) References Cited

U.S. PATENT DOCUMENTS

2010/0222110 A1* 9/2010 Kim ...................... G06F 1/1616
455/566
2012/0154300 A1 6/2012 Ma
2014/0002408 A1* 1/2014 Abbate ............... G06F 3/03547
345/174

FOREIGN PATENT DOCUMENTS

CN 102495689 A 6/2012
CN 102541400 A 7/2012
(Continued)

OTHER PUBLICATIONS

Chinese Office Action regarding Application No. 201610080262.2 dated Aug. 2, 2018. Translation provided by Dragon Intellectual Property Law Firm.

*Primary Examiner* — Adam J Snyder
(74) *Attorney, Agent, or Firm* — Harness, Dickey & Pierce, P.L.C.

(57) ABSTRACT

The present disclosure relates to a touch device, a display device and an intelligent device. The touch device provides touch information to the display device, and includes a base that is capable of being detachably connected to the display device; a touch screen that is arranged on the base; a touch screen control chip that is connected to the touch screen, and configured to detect a touch operation on the touch screen and generate the touch information; a transmitter that is arranged on the base and connected to the touch screen control chip, and configured to transmit the touch information to the display device; and a power supply that is arranged on the base and connected to the touch screen
(Continued)

control chip and the transmitter, and configured to supply power to the touch screen control chip and the transmitter.

16 Claims, 3 Drawing Sheets

(51) Int. Cl.
*G06F 3/044* (2006.01)
*G06F 1/16* (2006.01)

(58) Field of Classification Search
USPC ........................................ 345/174; 178/18.06
See application file for complete search history.

(56) References Cited

FOREIGN PATENT DOCUMENTS

| | | |
|---|---|---|
| CN | 103425344 A | 12/2013 |
| CN | 104035483 A | 9/2014 |

\* cited by examiner

TOUCH DEVICE DETACHABLY CONNECTED TO DISPLAY DEVICE, DISPLAY DEVICE AND INTELLIGENT DEVICE

CROSS-REFERENCE TO RELATED APPLICATION

This application claims a priority of Chinese Patent Application No. 201610080262.2 on Feb. 4, 2016, which is incorporated herein by reference in its entirety.

TECHNICAL FIELD

The present disclosure relates to the field of the display technology, in particular to a touch device, a display device and an intelligent device.

BACKGROUND

In the field of the handheld device, a touch screen may provide better interactive experience for a user, and thus has gradually replaced the traditional keyboard and become a mainstream of an input device. In the related art, the touch screen is fixed onto a display screen of a display device by means of various processes. For example, in recent years, the mainstream smartphone on the market has a touch screen as the input device. Therefore, the size of a mobile phone can be effectively used so that the display area can be maximized. In order to implement a thinner and lighter mobile phone to improve the user experience, it is a main development direction to integrate the touch screen onto a display module.

So far, as for the smartphone, besides a basic function of telecommunication, it has further functions of running various APP (application) softwares, which may better meet a user's requirements on multimedia such as videos, music, games and news. As a result, due to the integration of the touch screen and the display screen in the related art, an operation has to be carried out within the display area of the mobile phone by the user's fingers. Therefore, for certain applications such as videos, games and the like, a continuity for the user's operation is adversely affected, and thus the operation experience of the user is deteriorated.

SUMMARY

An object of the present disclosure is to provide a touch device and a display device that can be separated, so that the user's fingers may carry out a touch operation in a region other than a display area of a display device. Hence, it may improve the operation experience of the user for some applications.

In one aspect, the present disclosure provides in some embodiments a touch device for providing touch information to a display device, comprising: a base that is capable of being detachably connected to the display device; a touch screen that is arranged on the base; a touch screen control chip that is connected to the touch screen, and configured to detect a touch operation on the touch screen and generate the touch information; a transmitter that is arranged on the base and connected to the touch screen control chip, and configured to transmit the touch information to the display device; and a power supply that is arranged on the base and connected to the touch screen control chip and the transmitter, and configured to supply power to the touch screen control chip and the transmitter.

Alternatively, the transmitter comprises a wire transmission module and a wireless transmission module, wherein the wire transmission module is capable of transmitting the touch information to the display device in a wire transmission mode, and the wireless transmission module is capable of transmitting the touch information to the display device in a wireless transmission mode.

Alternatively, in the case that the touch device and the display device are in a state of being separated from each other, the transmitter transmits the touch information to the display device by the wireless transmission module.

Alternatively, in the case that the touch device and the display device are in a state of being integrated, the transmitter transmits the touch information to the display device by the wire transmission module.

Alternatively, the transmitter comprises a wireless transmission module that is capable of transmitting the touch information to the display device in a wireless transmission mode.

Alternatively, in the case that the touch device and the display device are in a state of being separated from each other and in the case that the touch device and the device are in a state of being integrated, the transmitter transmits the touch information to the display device by the wire transmission module.

Alternatively, the wireless transmission module includes a Bluetooth module, a WiFi module or an infrared module.

Alternatively, at least one connector is further arranged on the base, and the base is capable of being detachably connected to the display device through the at least one connector.

In another aspect, the present disclosure provides in some embodiments a display device being capable of receiving the touch information transmitted by the above touch device and carrying out a display operation according to the touch information, wherein the display device is capable of being detachably connected to the base of the touch device, and the display device comprises: a receiver that is configured to receive the touch information transmitted by the transmitter of the touch device; and a processor that is configured to display a corresponding image according to the received touch information.

Alternatively, in the case that the touch device and the display device are in a state of being integrated, a power supply of the display device is configured to supply power to both the display device and the touch device.

In yet another aspect, the present disclosure provides an intelligent device including the above touch device and the above display device, and the touch device and the display device are capable of being detachably assembled.

In contrast to the related art, in the touch device, the display device and the intelligent device according to the present disclosure, the hands of the user are not limited to carry out operations within a range of the display screen. In addition, with the touch device and the display device being capable of being detachably integrated, the intelligent device can be developed to be thinner and lighter, and the touch device can serve as an individual structural unit for optimizing the design and enhancing the user experience.

BRIEF DESCRIPTION OF THE DRAWINGS

In order to illustrate the technical solutions of the present disclosure or the embodiments in the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION

The technical solutions of the present disclosure will be described hereinafter in a clear and complete manner in conjunction with the drawings in the embodiments of the present disclosure. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

According to the handheld device in related art, the touch screen may provide better interactive experience for the user, and thus has gradually replaced the traditional keyboard and become the mainstream of the input device; however, the whole touch screen is fixed onto the display screen of the mobile phone by means of various process means, and thus the hands of the user are limited to carry out operations within a range of the display screen, so that the user may feel uncomfortable to operate the handheld device in the cases such as the handheld device is running an video player application or a game application.

Therefore, the present disclosure provides a solution where the touch screen may be integrated to the display device through a connector and the touch screen may be alternatively separated from the display device, wherein the touch screen can transmit the touch information to the display device by a communication module, so that the user may carry out the operation remotely from the display device in the cases such as the display device is running an video player application or a game application.

Figure 1:
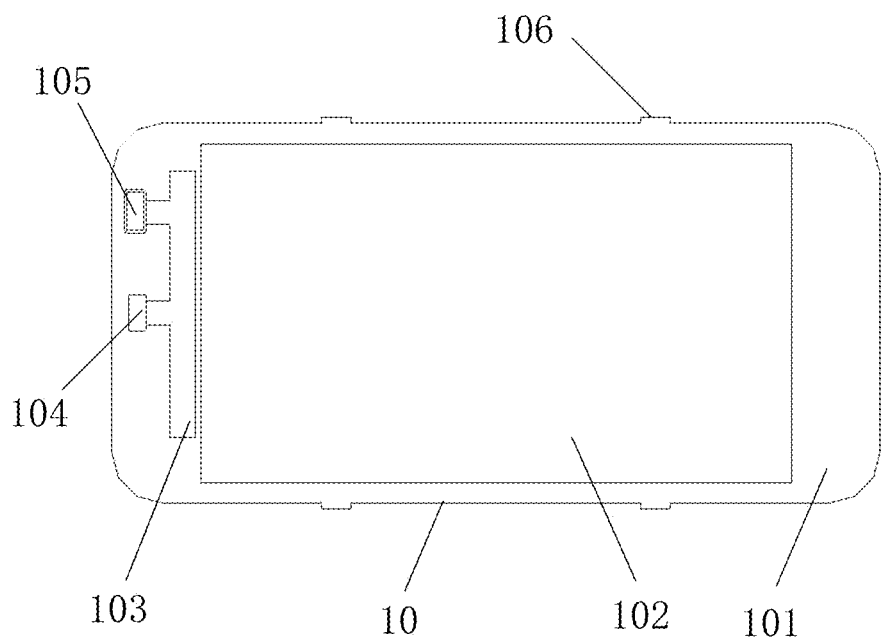
FIG. 1 is a schematic view showing a touch device according to the embodiments of the present disclosure.

The present disclosure provides in some embodiments a touch device, which can be configured to provide the touch information for a display device. FIG. 1 is a schematic view showing a touch device according to the embodiments of the present disclosure. As shown in FIG. 1, a control device 10 includes a base 101 is capable of being detachably arranged on the display device; a touch screen 102 that is arranged on the base 101; a touch screen control chip 103 that is connected to the touch screen 102, and configured to detect a touch operation on the touch screen 102 and generate the touch information; a transmitter 104 that is arranged on the base 101 and connected to the touch screen control chip 103, and configured to transmit the touch information to the display device; and a power supply 10 that is arranged on the base and connected to the touch screen control chip 103 and the transmitter 104, and configured to supply power to the touch screen control chip 103 and the transmitter 104.

In related art, modules for transmitting and receiving information generally operate in a wire transmission mode or in a wireless transmission mode. In the wire transmission mode, the module for transmitting information and the module for receiving information are connected by means of a wire on a Printed Circuit Board (PCB) or another conventional conductive wire. In the wireless transmission mode, it is not necessary to arrange physical wires. In addition, a wireless transmission module is more convenient to be deployed, so that the wireless transmission module is extensively used, and receives more attentions from manufacturer. A common wireless transmission modules include a WiFi module, a Bluetooth module, an infrared module or the like.

Therefore, in the embodiments of the present disclosure, for facilitating transmitting the touch information to the display device, the transmitter 104 may be designed in one of the following manners.

In a first manner, both the wire transmission module and the wireless transmission module are arranged in the transmitter 104. The wire transmission module is capable of transmitting the touch information to the display device in the wire transmission mode, and the wireless transmission module is capable of transmitting the touch information to the display device in the wireless transmission mode.

In the above manner, the user may selectively use one of the two transmission modes, and the transmitter 104 may be used for multiple purposes. Furthermore, in the case that one of the two transmission modules is damaged, the other transmission module may be used. That is, a robust of the transmitter 104 is improved in such manner.

Specifically, in the first manner, in the case that the touch device 10 and the display device are in a state of being separated from each other, the transmitter 104 uses the wireless transmission module to transmit the touch information to the display device, whereas in the case that the touch device 10 and the display device are in a state of being integrated, the transmitter 104 uses the wire transmission module to transmit the touch information to the display device.

In a second manner, only the wireless transmission module is arranged in the transmitter 104. The wireless transmission module is capable of transmitting the touch information to the display device in the wireless transmission mode.

In contrast to the first manner, the user has to use the wireless transmission module to transmit the touch information to the display device without an alternative option in the second manner. However, since only the wireless transmission module is arranged, it occupies a smaller space in the touch device. Therefore, the manufacturing process is simplified, and it is not necessary to provide such devices as connectors and wires which may be required for connecting the wire transmission modules of the display device and the touch device when the display device is integrated to the touch device in the wire transmission mode.

In the second manner, in the case that the touch device 10 and the display device are in a state of being separated from each other and in a state of being integrated, the transmitter 104 uses the wireless transmission module to transmit the touch information to the display device.

For example, in both the first manner and the second manner, the wireless transmission module may be the Bluetooth module having a good transmission performance. Alternatively, during actual implementations, another wireless transmission module such as a WiFi transmission module can be used. In the embodiments of the present disclosure, the wireless transmission module is not limited to the above examples.

In other words, in the embodiments of the present disclosure, the touch screen is designed to be an independent module that can be separated from the display device and detachably integrated with the display device by the wireless transmission technology such as the Bluetooth providing a good transmission performance. As a result, the touch device such as a touch screen unit may be physically connected to a display device of e.g., the mobile phone by a connector to form a conventional intelligent device mechanism; alternatively, the touch screen can be separated from the touch screen, so that the touch screen may communication with the main body of the mobile phone as well as implement the touch function by means of the Bluetooth module.

Figure 6:
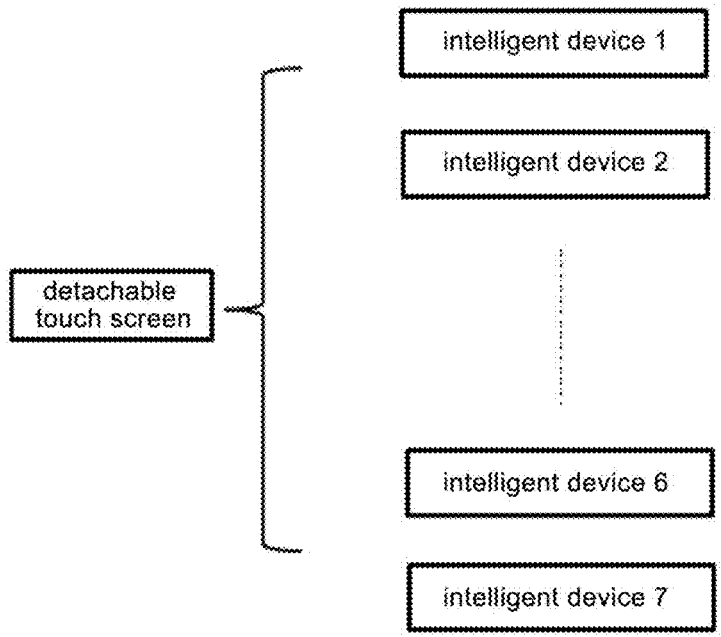
FIG. 6 is a schematic view showing expanding applications of the touch device and the intelligent device according to embodiments of the present disclosure.

As shown in FIG. 6, in order to detachably integrate the touch device 10 and the display device, the base 101 is provided thereon with at least one connector 106 capable of connecting the touch device 10 to the display device in the touch device 10.

Figure 2:
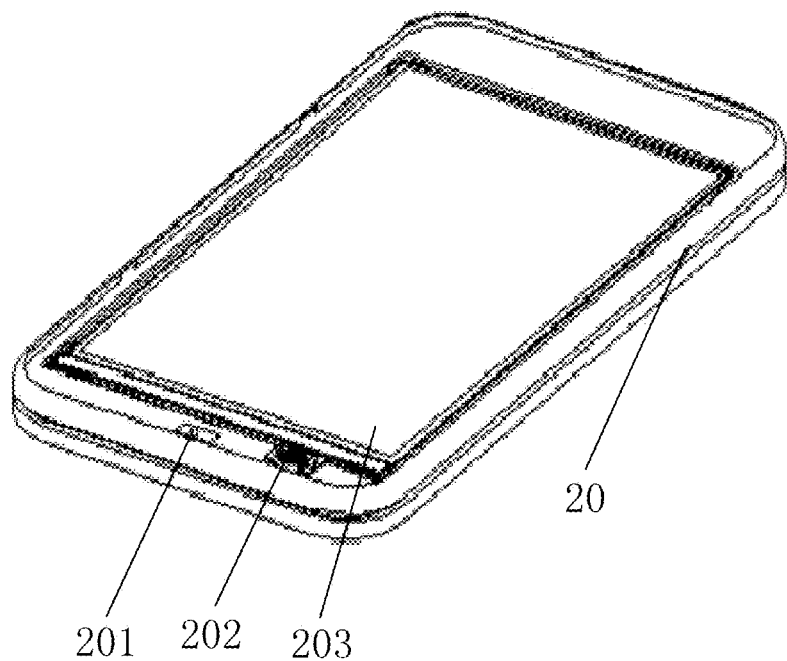
FIG. 2 is a schematic view showing a display device according to the embodiments of the present disclosure.

Corresponding to the above touch device, the present disclosure further provides in some embodiments a display device, which is capable of receiving the touch information transmitted by the touch device and carrying out a display operation according to the touch information, wherein the display device is capable of being detachably connected to the base of the touch device. FIG. 2 is a schematic view showing a display device according to the embodiments of the present disclosure. As shown in FIG. 2, a display device 20 may include a receiver 201 configured to receive the touch information transmitted by the transmitter of the touch device; a processor 202 configured to display a corresponding image according to the received touch information, a display screen 203; and a power supply (not shown in FIG. 2).

It should be noted that, in an alternatively embodiment, the power supply of the display device not only may supply power to the display device for displaying an image, but may charge a power module of the touch device as well when the touch device and the display device are in a state of being integrated.

In addition, since the touch device may be separated from the display device and operates independently, the touch device is generally designed to be thinner and lighter as much as possible so that it is more portable. Therefore, the power module of the touch device has to be thinner and lighter and occupy a smaller area, so as to meet requirements on the thickness and the size, and thus it will not additionally occupy the area of the display screen. As a result, the power module of the touch device stores less power. Therefore, when the touch device and the display device are integrated, the power supply of the display device can be used to charge the power module of the touch device, so that the touch device may operates for a longer time during a period that the touch device is separated from the display device.

Figure 3:
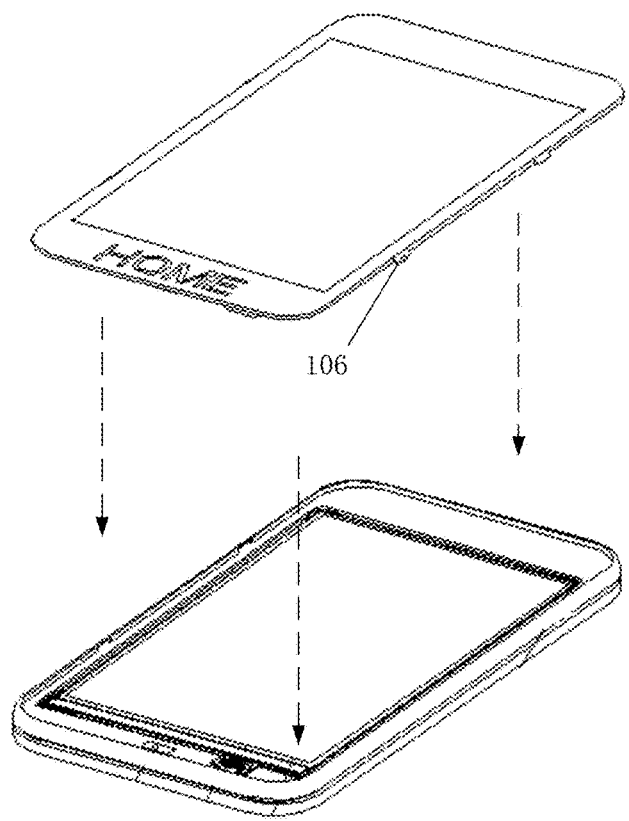
FIG. 3 is a schematic view showing the separation and integration of the touch device and display device according to the embodiments of the present disclosure.

For facilitating understanding of the mechanism how the touch device and the display device are separated and integrated, as shown in FIG. 3, it is a schematic view showing the integration and the separation of the touch device and the display device according to the embodiments of the present disclosure. As mentioned above, the connector 106 is arranged on the touch device. During actual implementations, the connector 106 may be a buckle, a latch, a screw and the like. Of course, both FIGS. 1 and 3 are for illustration purpose only, but the present disclosure is not limited thereto. In order to fit the connector 106, a mating member may be arranged on the display device based on specific situations. As shown in FIGS. 1 and 3, the connectors 106 include four buckles. With engaging forces of the four buckles, a general wrapping force is generated to effectively wrapping the display device. Therefore, even if there is no mating members arranged on the display device, the touch device and the display device will be not easy to be separated when they are integrated by fastening the buckles.

In the embodiments of the present disclosure, it is provided a novel mechanism of combining the touch screen and the display module. With such mechanism, the touch screen can be arranged on a surface of the display module, and connect to and communicate information with the display module through a physical connector, or may communicate information with the display module in a remote wireless transmission mode by means of the Bluetooth module.

Based on the above touch device and the above display device that may operates independently, the present disclosure further provides in some embodiments an intelligent device. The intelligent device may include the above touch device and the above display device that may be detachably integrated.

That is, based on the above detachable touch device and the detachable display device, the present disclosure provides in some embodiments an intelligent device that uses the above two devices simultaneously.

During actual implementations, the touch device and the display device can be manufactured in a standardized production, so that a touch device may be applied to any one of a plurality of display devices, while the display device may be applied to any one of a plurality of touch devices.

However, considering competitive factors, one manufacturer may manufacture an individual component (i.e. a display device or a touch device) that cannot support the individual component (i.e. a touch device or a display device) manufactured by another manufacturer. In such a case, a manufacturer may generally manufacture its uniquely designed intelligent device including a touch device and a display device that can be detachably integrated, which may enhance a user experience in certain application scenarios.

Therefore, the industrialization rate of the intelligent device that is detachably integrated may be higher. In the following, the above intelligent device will be further explained by referring to FIGS. 4 to 6.

Figure 4:
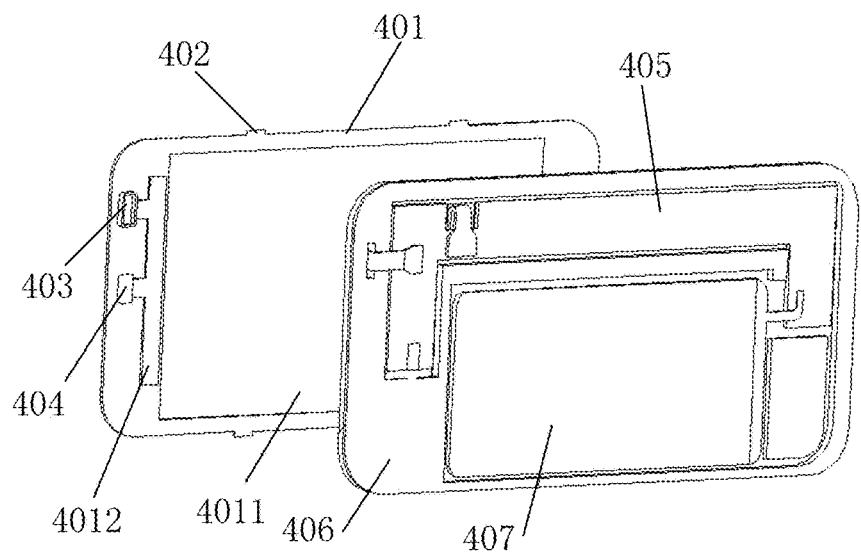
FIG. 4 is a schematic view showing an intelligent device according to the embodiments of the present disclosure.

FIG. 4 is a schematic view showing an intelligent device according to the embodiments of the present disclosure. As shown in FIG. 4, the intelligent device (for example, a smartphone) mainly includes six modules, i.e. a touch module 401 (i.e. the above touch device), a connector 402, a power module 403, a Bluetooth module 404, a main body (i.e. the above display device including a mainboard 405 and a case 406) and a mainboard power module 407.

As shown in FIG. 4, the touch module 401 is connected to the case 406 through the connector 402, so that the touch module 401 may be integrated to or separated from the main body at any time. A protective film (not shown in FIG. 4) is arranged within the case, so as to prevent dust from entering the display area of the main body during a process of separation.

The touch module 401 mainly includes a touch screen 4011 and a drive circuit 4012 (i.e. the above touch screen control chip) for the touch screen 4011, so as to implement a touch operation on a touch function area.

The connector 402 (i.e. the above connector) is a connection device, which provides a physical connection between the touch screen 401 and the mainboard 405 so as to enable conventional operations on the mobile phone.

The power module 403 may be a small lithium battery. It supplies power to the touch module 401 after the touch module 401 is separated from the mainboard 405, and the mainboard power module 407 may charge the power module 403 after the touch module 401 is connected to the mainboard 405.

The Bluetooth module 404 is provided therein with an Inter-Integrated Circuit (I2C) interface, which can implement a touch information interaction with the touch module 401 while implementing an interaction with the mainboard 405 through a Bluetooth protocol with low power consumption. The I2C interface is a key component for the communication between the touch module 401 and the mainboard 405 after the touch module 401 and the mainboard 405 are separated from each other.

Figure 5:
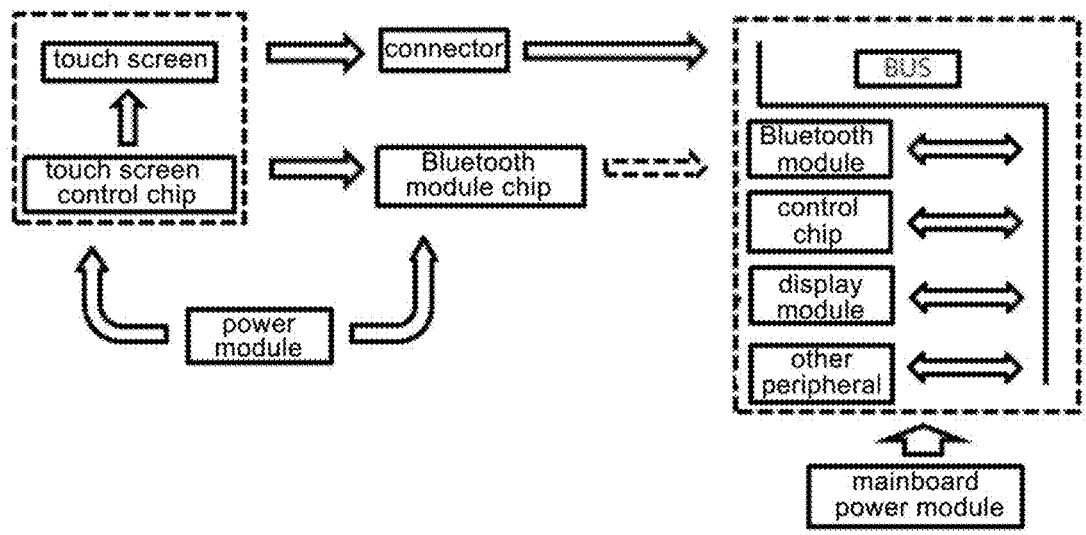
FIG. 5 is a schematic view showing an operation of the intelligent device according to the embodiments of the present disclosure.

FIG. 5 is a schematic view showing an operation of the intelligent device according to the embodiments of the present disclosure. As shown in FIG. 5, the mainboard 405 at the right side in FIG. 5 may interact with the touch module 401 at the left side in FIG. 5 by the Bluetooth module connected to the bus, and the touch screen can transmit the touch signal to the Bluetooth module at the right side in FIG. 5 through the Bluetooth module chip, and control the display module and other peripherals through the control chip. It should be noted that the Bluetooth module may transmit signals to the touch screen in a similar manner.

The mainboard power module 407 is mainly responsible for supplying power to the mainboard 405. In addition, after the touch module 401 is physically connected to the mainboard 405, the mainboard power module 407 may charge the power module 403.

FIG. 6 is a schematic view showing an extended application of the touch device and the intelligent device according to embodiments of the present disclosure. As shown in FIG. 6, in the extended application, an independent touch screen can be used to simultaneously control a plurality of intelligent devices. For example, the independent touch screen can be used to simultaneously control up to seven intelligent devices based on the Bluetooth techniques in the related art. As a result, it may bring the user with more convenient and more efficient use experience. As can be seen, in the embodiments of the present disclosure, one touch module may be used to control a plurality of terminals.

As can be seen, in the embodiments of the present disclosure, in some specific scenarios such as the handheld device is running an video player application or a game application, the user may use the separated touch screen just like, e.g. "a remote controller" or "a wireless joystick", and thus, the hands of the user are not limited to carry out operations within a range of the display screen. In addition, with the touch device and the display device being capable of being detachably integrated, the intelligent device can be developed to be thinner and lighter, and the separated touch screen can serve as an individual structural unit for optimizing the design and enhancing the user experience.

The above are merely the preferred embodiments of the present disclosure. It should be noted that, a person skilled in the art may make further modifications and improvements without departing from the principle of the present disclosure, and these modifications and improvements shall also fall within the scope of the present disclosure.

What is claimed is:

1. A touch device for providing touch information to a display device, comprising:
   a base that is capable of being detachably connected to the display device;
   a touch screen that is arranged on the base;
   a touch screen control chip that is connected to the touch screen, and configured to detect a touch operation on the touch screen and generate the touch information;
   a transmitter that is arranged on the base and connected to the touch screen control chip, and configured to transmit the touch information to the display device; and
   a power supply that is arranged on the base and connected to the touch screen control chip and the transmitter, and configured to supply power to the touch screen control chip and the transmitter,
   wherein the transmitter comprises a wire transmission module and a wireless transmission module, the wire transmission module is capable of transmitting the touch information to the display device in a wire transmission mode, and the wireless transmission module is capable of transmitting the touch information to the display device in a wireless transmission mode, and
   in the case that the touch device and the display device are in a state of being integrated, the transmitter is further configured to transmit the touch information to the display device by the wire transmission module only when the wireless transmission module is damaged.

2. The touch device according to claim 1, wherein in the case that the touch device and the display device are in a state of being separated from each other, the transmitter transmits the touch information to the display device by the wireless transmission module.

3. The touch device according to claim 1, wherein the wireless transmission module comprises a Bluetooth module, a WiFi module or an infrared module.

4. The touch device according to claim 1, wherein at least one connector is further arranged on the base, and the base is capable of being detachably connected to the display device through the at least one connector.

5. The touch device according to claim 4, wherein the wireless transmission module comprises a Bluetooth module, a WiFi module or an infrared module.

6. The touch device according to claim 4, wherein the at least one connector comprises a plurality of buckles, and the base is capable of being detachably connected to the display device through engaging forces of the buckles.

7. A display device capable of receiving the touch information transmitted by the touch device according to claim 1 and carrying out a display operation according to the touch information, wherein the display device is capable of being detachably connected to the base of the touch device, and the display device comprises:
   a receiver that is configured to receive the touch information transmitted by the transmitter of the touch device; and
   a processor that is configured to display a corresponding image according to the received touch information.

8. The display device according to claim 7, wherein in the case that the touch device and the display device are in the state of being integrated, a power supply of the display device is configured to supply power to both the display device and the touch device.

9. The display device according to claim 8, wherein in the case that the touch device and the display device are in a state of being separated from each other, the transmitter transmits the touch information to the display device by the wireless transmission module.

10. The display device according to claim 7, wherein the wireless transmission module comprises a Bluetooth module, a WiFi module or an infrared module.

11. The display device according to claim 7, wherein at least one connector is further arranged on the base, and the base is capable of being detachably connected to the display device through the at least one connector.

12. The display device according to claim 11, wherein the wireless transmission module comprises a Bluetooth module, a WiFi module or an infrared module.

13. The display device according to claim 11, wherein the at least one connector comprises a plurality of buckles, and the base is capable of being detachably connected to the display device through engaging forces of the buckles.

14. An intelligent device comprising the touch device according to claim 1, wherein the intelligent device further comprises:
a display device that is capable of receiving the touch information transmitted by the touch device and carrying out a display operation according to the touch information, wherein the display device is capable of being detachably connected to the base of the touch device, and the display device comprises: a receiver that is configured to receive the touch information transmitted by the transmitter of the touch device; and a processor that is configured to display a corresponding image according to the received touch information, wherein the touch device and the display device are capable of being detachably integrated.

15. The touch device according to claim 1, wherein the touch screen is transparent.

16. The touch device according to claim 1, wherein touch screen control chip is further configured to detect the touch operation on the touch screen both in the case that the touch device and the display device are in a state of being separated from each other and in the case that the touch device and the display device are in the state of being integrated.

* * * * *